United States Patent [19]
Wallace et al.

[11] 4,008,773
[45] Feb. 22, 1977

[54] TIGHTENING SYSTEM

[75] Inventors: Paul W. Wallace, Warrington, Pa.; John T. Boys, Christchurch, New Zealand

[73] Assignee: Standard Pressed Steel Co., Jenkintown, Pa.

[22] Filed: May 19, 1975

[21] Appl. No.: 579,109

[52] U.S. Cl. .............................. 173/12; 73/136 A; 73/139
[51] Int. Cl.² .......................................... B23Q 5/06
[58] Field of Search ............... 173/12; 73/133, 136, 73/139

[56] References Cited

UNITED STATES PATENTS

| | | | |
|---|---|---|---|
| 2,756,622 | 7/1956 | La Belle | 73/139 |
| 3,368,396 | 2/1968 | Burkleo et al. | 73/139 |
| 3,643,501 | 2/1972 | Pauley | 73/133 |
| 3,693,726 | 9/1972 | Hornig et al. | 173/12 |
| 3,710,874 | 1/1973 | Seccombe et al. | 73/139 |

Primary Examiner—Ernest R. Purser
Assistant Examiner—William F. Pate, III
Attorney, Agent, or Firm—Andrew L. Ney; Aaron Nerenberg

[57] ABSTRACT

The preferred embodiments of the invention disclosed herein relate to a tightening system comprising a wrench for rotating and applying torque to a fastener system, means for developing a signal representative of the torque being applied and means for developing a signal representative of the rotation. A control system is operatively associated with the wrench for determining which of the two signals is increasing faster. If the torque signal is increasing faster than the rotation signal, the control system modifies the rotation signal by increasing it until it corresponds to the torque signal, but cannot decrease the modified rotation signal when the increase of the torque signal is less than the increase of the rotation signal. When the increase of the torque signal decreases relative to the modified rotation signal, the control system develops a decision-making signal which is processed to develop a control signal when a yield point of the fastener system is detected.

18 Claims, 7 Drawing Figures

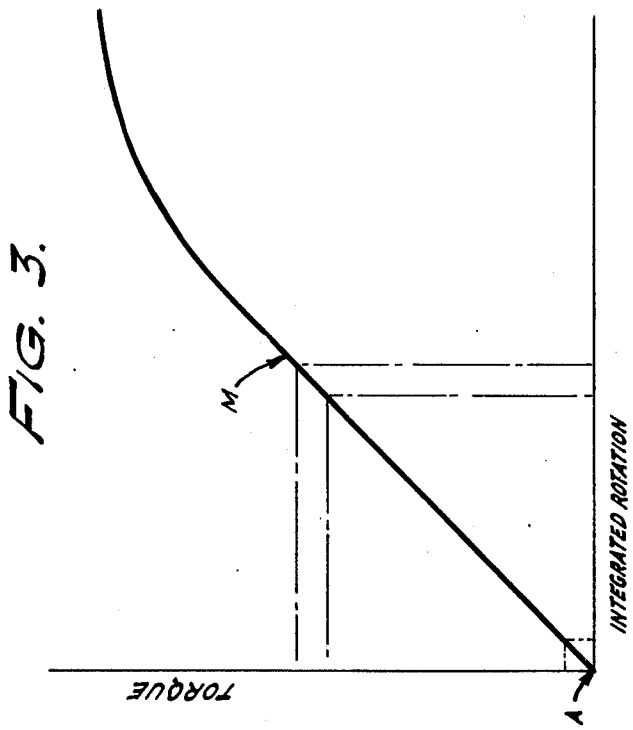
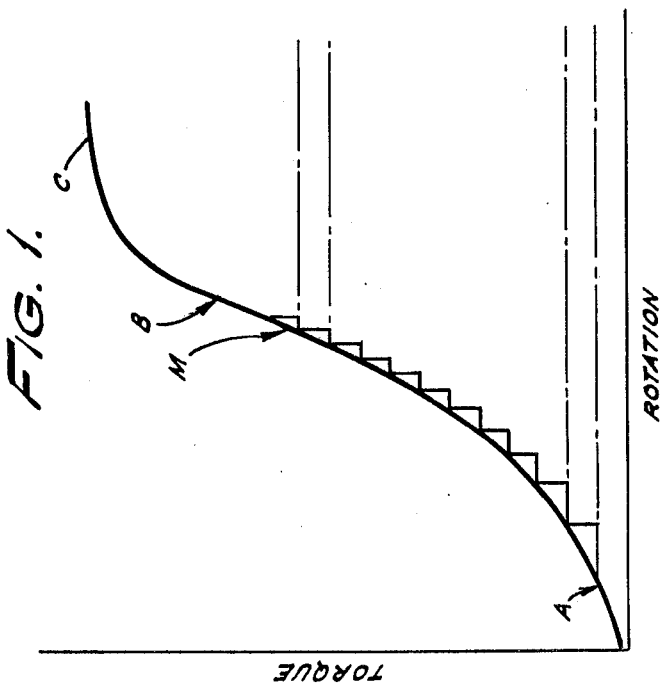
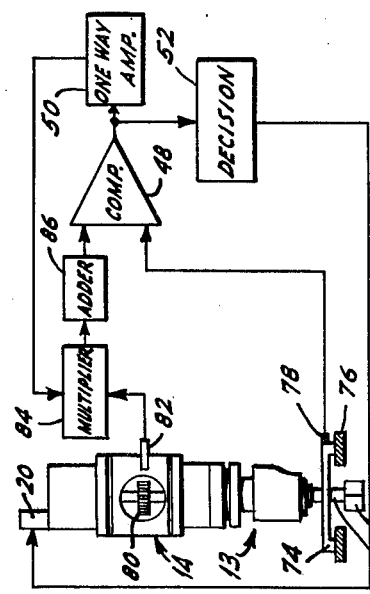
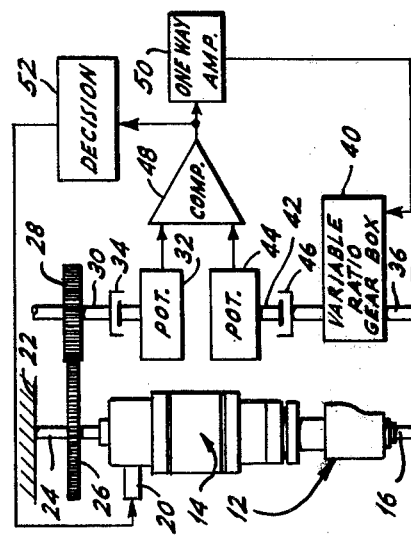
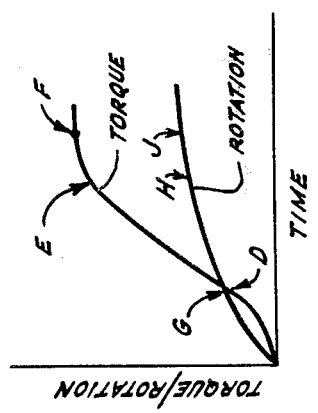

TIGHTENING SYSTEM

This invention relates generally to apparatus for tightening fasteners and, more particularly, to apparatus for tightening fasteners to the yield point of the fastener material or some other predetermined axial load on the fastener characterized by a flattening of the torque-rotation curve plotted for the particular fastener being tightened.

In the design of structural joints secured by mechanical fastener systems it is usual to provide for the fasteners to exert a predetermined clamping force or load on the structural members to insure the integrity of the joint. When the joints are assembled, therefore, it is necessary that the fasteners be tightened to exert a predetermined axial load on the structural members. However, prior art techniques for tightening threaded fasteners such as nuts and bolts to exert a predetermined load are not entirely satisfactory. The most accurate technique involves a measurement of the axial strain or stretch of the bolt while it is being tightened which can be related to the stress or load acting on the bolt through the previously calculated stress-strain relationship for the bolt. While most accurate, practical applications of the fastener do not usually permit measurement of the stretch in the bolt and, in those instances where the stretch can be measured, it is a time consuming and relatively expensive technique. Accordingly, this technique is used in relatively few applications outside of laboratory testing.

Another known technique and that most commonly used in most joint assembly operations involves the use of torque controlled tools, that is, tools that determine when the torque applied to the fastener equals or slightly exceeds a predetermined value and act to interrupt the flow of power to the tool. Torque measurement is relatively easy and since torque is related to the tensile stress or axial force experienced by the fastener, and exerted on the structural members, a predetermined torque theoretically corresponds to the predetermined clamp load specified for the joint. However, when tightening threaded fasteners in assembly line operations, wide variations in the actual torque tension relationships are experienced. These variations are caused by a variety of factors including allowable tolerance variations in the dimensions and strength of the fasteners and structural members and lubrication or absence thereof on the mating surfaces of the fasteners and/or the structural members, all of which, in turn, cause large variations in the coefficient of friction between the mating surfaces. In actual practice, variations of up to $\pm 30\%$ in the axial load on the bolts used for a particular application can be experienced at the same torque level. Accordingly, the torque control technique is not very accurate.

In an effort to overcome the problems associated with the prior art tightening techniques, another technique has been attempted. This technique is disclosed in the U.S. Pat. to Pauley, No. 3,643,501, issued Feb. 22, 1972 and utilizes the characteristic shape of a curve plotted for the torque applied to the fastener being tightened vs. its rotation during the tightening cycle. The torque-rotation curve for any particular fastener includes an initial or pretightening region wherein the fastener is being rotated but has not yet fully seated on the adjacent structural member; a tightening region wherein the fastener is being tightened within its elastic limit and which is generally linear; and, a yield region wherein its limit of proportionality has been exceeded and wherein the curve begins to flatten and finally flattens out at the yield point of the fastener. The technique disclosed in the Pauley patent utilizes a wrench including a first gear train for driving a first control arm in accordance with the torque being applied to the fastener and a second gear train for driving a second control arm in accordance with the rotation of the fastener. Each control arm includes a portion of a switch member connected in a circuit controlling the operation of the wrench. During rotation of the fastener in the tightening region, the control arms are driven in unison and the switch members are closed. When the limit of proportionality is exceeded, the second control arm is driven faster than the first control arm so that the switch members open, the control circuit is broken and the wrench shuts off. Theoretically the wrench shuts off at the yield point of the fastener.

For various reasons, the device disclosed in the Pauley patent is not entirely satisfactory. First, if the control arms are to be driven in unison in the tightening region of the torque-rotation curve, the slope of the curve must be known beforehand so that the gear trains can be properly related. For the same reasons set out with respect to the torque-tension relationship, similar variations occur in the torque-rotation relationships generated for a group of theoretically similar fasteners. Thus, the gear trains required to drive the control arms when tightening any particular fastener in a group of similar fasteners, will be different.

Another problem associated with the device disclosed in the Pauley patent results from the temporary increases or decreases in the torque-rotation relationship which can be caused by areas of increased lubricity on the mating surfaces of the joint or temporary seizing or galling of the threads. These phenomena provide spikes in the tightening region of the torque-rotation curve which would cause the control arms to move relative to each other and cause the wrench to shut off prematurely. Obviously, premature shutoff of the wrench reduces the accuracy and reliability of the system.

It is an object of this invention, therefore, to provide a tightening system which can reliably and accurately determine the deviation from linearity on curves which can be plotted during the tightening cycle or from the point of maximum slope of such curves.

It is yet another object of this invention to provide a tightening system for tightening a fastener to its yield point or other point having a significant change in the slope of the torque-rotation curve and corresponding to a predetermined axial load.

It is still another object of this invention to provide a tightening system for tightening a fastener to a predetermined axial load with minimum previous knowledge of the particular joint being assembled.

Finally, it is an object of this invention to provide a tightening system that is versatile, reliable, economical and accurate.

These and other objects of this invention are accomplished by providing a tightening system including a wrench for applying torque and imparting rotation to a fastener member. Associated with the wrench is a first mechanism for developing a signal representative of the torque being applied to the fastener and another mechanism for developing a signal representative of the rotation imparted to the fastener. A control system responsive to the torque and rotation signals determines which of the two signals is increasing at a faster rate and, if the torque signal is increasing faster than the rotation signal, increases the rotation signal to correspond to the torque signal. However, when the torque signal is changing at a decreasing rate relative to the rotation signal, the rotation signal is not decreased, but a decision-making signal is developed which signal can be processed to develop a control signal at a yield point of the fastener.

More particularly, in one embodiment of the invention the mechanism for developing the torque signal comprises a first gear system whose output is proportional to the torque being applied to the fastener and the mechanism for developing the rotation signal comprises a second gear system including a variable ratio gear system. The first gear system drives a first potentiometer and the second gear system drives a second potentiometer. The signals from the potentiometers are compared and when the incremental torque signal is greater than the incremental rotation signal, a signal is fed to a one-way amplifier which controls the variable ratio gear system to increase the rotation signal until it corresponds to the torque signal. When the incremental torque signal decreases relative to the modified rotation signal, a decision-making signal is developed and is fed to a decision-making circuit to develop the control signal. In another embodiment of the invention, the two gear system and potentiometers are replaced by a torque cell and an angular encoder device which develop signals representative of torque applied to and rotation of the fastener and these signals are compared as noted above. Finally, in another embodiment of the invention, the two potentiometers are replaced by a single potentiometer having an inner portion driven by the first gear system and an outer portion driven by the other gear system so that its output signal is fed either to the one-way amplifier or the decision-making circuit.

Processing of the decision-making signals can be accomplished in accordance with one of several other aspects of the invention. In accordance with one aspect, the decision-making signal or its rate of increase is compared to a predetermined signal representative of the yield point of the fastener and the control signal is developed when the signals are substantially equal. In accordance with a second aspect, the decision-making signal is compared to a signal proportional to either the torque or rotation signal and the control signal is developed when the compared signals have a predetermined relationship. According to the second aspect, no predetermined knowledge of the joint assembly is required.

For a better understanding of the invention disclosed herein, reference is made to the following description of several preferred embodiments taken in conjunction with the figures of the accompanying drawing, in which:

FIG. 1 is a plot of a curve illustrating the characteristics of the typical torque-rotation relationship experienced by a fastener during a tightening cycle;

FIG. 2 is a plot of a curve illustrating the characteristics of typical torque-time and rotation-time relationships experienced by a fastener during a tightening cycle;

FIG. 3 is a plot of a curve illustrating an underlying principle of operation of a tightening system in accordance with this invention;

FIG. 4 is a schematic drawing of a tightening system in accordance with one embodiment of the invention;

FIG. 5 is a schematic drawing of a tightening system in accordance with another embodiment of the invention;

Figure 6:
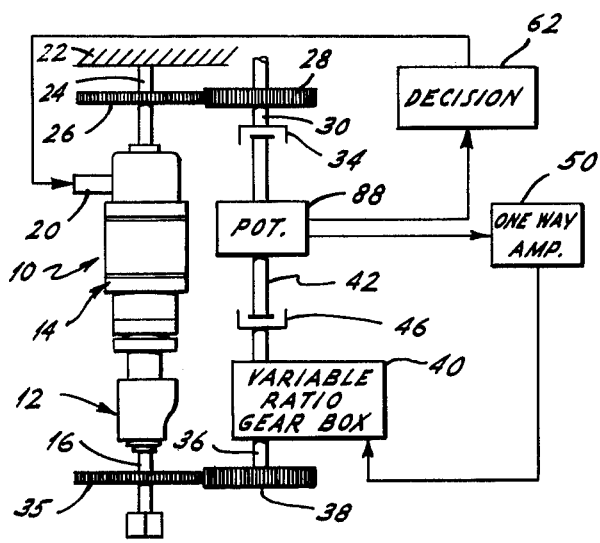
FIG. 6 is a schematic drawing of a tightening system in accordance with still another embodiment of the invention.

Referring to FIG. 1, there is illustrated a typical torque-rotation curve for a threaded fastener being tightened with the torque plotted along the vertical axis and with the rotation plotted along the horizontal axis. The curve includes an initial or pretightening region extending from the intersection of the torque and rotation axes to point A. In the pretightening region, mating threads of the fastener assembly have been engaged and one of the fasteners is being rotated, but the bearing face of the rotating fastener has either not contacted the adjacent face of the structural member included in the joint or has not completely pulled the structural members together. At point A on the curve the structural members have been completely pulled together by the fastener assembly and actual tightening of the joint commences. In the art, the torque at point A is commonly referred to as the "snug" torque. In the tightening region of the curve, extending from point A to point B, clamp load is actually being exerted on the structural members and the male member in the fastener assembly, that is, the bolt is stretching in the axial direction due to the induced tensile load. Throughout the tightening region the curve is approximately linear and in some cases may be exactly linear. As is most usual, however, the curve will include a slight curvature and, thus, a point M wherein the slope of curve is a maximum. At point B the limit of proportionality of the fastener has been reached. Beyond point B the torque and the rotation are no longer approximately linearly related and as shown, the slope of the curve is significantly reduced relative to the maximum slope. For purpose of this application, point B will be considered as the start of the yield region, but it will be understood that beyond point B, increasing load will still be induced in the joint assembly. Point C corresponds to the yield point of the fastener and while the definition of yield point varies slightly, can be considered to be the point beyond which deformation of the bolt is no longer purely elastic. As will become apparent, a tightening system in accordance with this invention is capable of detecting points M or B on the torque-rotation curve and responding thereto to generate a control signal at about point C. Further, it should be understood that particular joint assemblies could include further fastener assemblies constructed such as to deviate from linearity or from the point of maximum slope at a predetermined load other than at the yield point. Such deviation could be detected and used to generate a control signal. For this reason, as used hereinafter, the term yield point should be construed to include the yield point of the material from which the fastener is made as well as points on a flattened portion of a torque-rotation curve generated by the configuration of the fastener at a predetermined clamp load.

Referring now to FIG. 2, there are illustrated two more curves that will be explained to facilitate an understanding of certain aspects of the invention. The first curve, marked Torque, is a plot of the torque applied to the fastener versus time elapsed during the tightening cycle, torque being plotted along the vertical axis and time being plotted along the horizontal axis. The second curve, marked Rotation, is a plot of the angular displacement or rotation of the fastener versus time elapsed during the tightening cycle, rotation being plotted along the vertical axis and time again being plotted along the horizontal axis. The curves illustrated in FIG. 2 are not exact, but are generally close approximations useful in understanding certain aspects of the invention. Looking first at the Torque curve, there is a pretightening region in which the torque increases rather slowly and which extends from the intersection of the torque-time axes to point D. Thus, point D corresponds to point A on the torque-rotation curve. Point D to Point E represents the tightening region of the Torque curve similar to the region between points A and B of the torque-rotation curve. In the tightening region of the Torque curve, torque increases at a generally faster rate than in the pretightening region. Finally, the Torque curve includes a yield region from point E wherein the torque increases at a relatively slow rate and which corresponds to the yield region beyond point C on the torque-rotation curve. Point F represents the yield point of the fastener. Similarly, the Rotation curve includes a pretightening region extending from the intersection of the rotation-time axes to point G, a tightening region extending from points G to H and a yield region from point H. Point J on the Rotation curve represents the yield point. Reference to FIG. 2 will be made hereinafter during the description of the various embodiments in accordance with the invention.

In FIG. 4, there is illustrated a first embodiment of a tightening system 10 in accordance with this invention. Tightening system 10 includes a wrench 12 having a motor 14, a drive shaft 16 and a driver bit 18. Drive shaft 16 is rotated by motor 14 to transmit torque and rotation to a fastener engaged by driver bit 18. Wrench 12 can be of any conventional type and as is most common, motor 14 can be air-powered with the flow of motive fluid being controlled by a suitable control valve 20. It should be understood that motor 14 could also be electric, hydraulic or any combination of pneumatic, hydraulic or electric. The exact details of the wrench are not necessary for a proper understanding of the invention and, accordingly, a more specific description is not provided.

Wrench 12 is mounted on a rigid frame 22 of any suitable type by a torsion bar 24 which twists about the rigid frame when motor 14 is operative with a torque substantially equal to and opposite to the torque being applied to a fastener being tightened. Carried on torsion bar 24 is a first gear member 26 which drives a second gear member 28 fixed to an output shaft 30. One end of output shaft 30 is connected to drive the inner core of a potentiometer 32 and interposed between gear 28 and potentiometer 32 is a slip clutch 34. When wrench 12 is tightening a fastener, torsion bar 24 twists and rotates gear member 26 which drives gear member 28 and output shaft 30. The rotation of shaft 30 can be considered a signal representative of the torque applied to the fastener being tightened which signal is converted to an electrical signal by potentiometer 32 when the inner core of the potentiometer is driven by shaft 30. Use of slip clutch 34 precludes rotation of the inner core of potentiometer 32 and prevents an electrical output signal until the snug torque (points A and D on FIGS. 1 and 2, respectively) is being applied to the fastener. In practice, slip clutch 34 is arranged to engage at a reasonable approximation of the snug torque, for example, at about 20% of the nominal torque to be applied to the fastener.

Carried on drive shaft 16 is another gear member 35 which, when a fastener is being tightened, drives an output shaft 36 through a gear member 38. The output of shaft 36 drives a variable ratio gear system 40 which is arranged to drive another output shaft 42, the output end of which is connected to drive the inner core of a potentiometer 44. Intermediate the ends of shaft 42 is another slip clutch 46 which is also used to preclude rotation of the inner core of potentiometer 44 and prevents an electrical output signal until the snug torque is being applied to the fastener. The rotation of shaft 36 can be considered a signal representative of the angular rotation of the fastener which signal is modified by the setting of variable ratio gear system 40. Accordingly, the rotation of shaft 42 can be considered a signal representative of the modified rotation signal and is converted to an electrical signal by potentiometer 44.

Before proceeding with a further description of the apparatus utilized in the preferred embodiments of the invention, and underlying principle of the invention will be explained. Referring to FIG. 2 of the drawing, the torque and rotation curves illustrated therein can also be thought of as curves plotting the torque signal provided by shaft 30 and the rotation signal provided by shaft 36. It can be seen that in the approximately linear region or tightening region of the curves, points D to E on the Torque curve and points G to H on the Rotation curve, one of the signals, preferably the torque signal, is increasing faster than the other signal, preferably, the rotation signal. The exact relationship between the signals is, of course, dependent on the flexibility of torsion bar 24 and the gear ratios between shafts 24 and 30 and between shafts 16 and 36. As noted, it is preferable to arrange the gearing so that after the snug torque is applied, the torque signal initially increases faster than the rotation signal. According to an underlying principle of the invention, the rotation signal is modified by being multiplied by a factor $X$. Preferably the rotation signal is multiplied incrementally, so that the rotation signal is equal to the torque signal throughout a certain portion of the tightening region of the curves. In effect the Torque and Rotation curves are made to coincide.

In the preferred embodiment of the invention disclosed in FIG. 4 of the drawing, multiplication of the rotation signal is accomplished by variable ratio gear system 40. When a fastener is tightened and when clutches 34 and 46 have engaged, at the snug point of the Torque-Rotation curve, the variable ratio gear system 40 is set such that the rotation of shaft 42 is equal to the rotation of shaft 36 that is, the initial rotation of shaft 42 is also a signal representative of the initial rotation of the fastener. The signals provided by shafts 30 and 42 are, as also noted previously, converted into electrical signals by potentiometers 32 and 44, respectively, and are fed to comparator 48 which can be in the form of a differential amplifier providing an output signal representative of the difference between the initial torque and rotation signals. The output signal is fed to a one-way amplifier 50 that is, an amplifier having a gain characteristic in one direction only and the one-way amplifier provides an output signal to variable ratio gear system 40 which increases its gear ratio. By increasing the gear ratio of variable ratio gear system 40, the rotation of output shaft 42 as well as the output of potentiometer 44 are modified, that is, are increased by being multiplied by a factor X which is equal to the increased gear ratio. When the output of potentiometer 44 equals that of potentiometer 32, comparator 48 no longer provides a significant output signal to one-way amplifier 50 and the one-way amplifier, in turn, provides no operative signal to variable ratio gear system 40. At this point the gear ratio of variable ratio gear system 40 is fixed only temporarily as will be explained hereinafter, and continues to multiply the rotation signal and provide the modified rotation signal which is representative of a factor X, multiplied by each increment of the rotation signal measured from the snug point. If the rate of increase of the torque signal again increases relative to the rate of increase of the rotation signal, that is, if the torque signal increases relative to the modified rotation signal provided by potentiometer 44, comparator 48 again provides an output signal to one-way amplifier 50 which increases the gear ratio of variable ratio gear system 40 whereby it multiplies an increment of the rotation signal measured from the point where the torque signal increased by another factor, $X_2$, and adds the new multiplied increment of the rotation signal to previously multiplied increment of the rotation signal until the modified signal provided by shaft 42 and potentiometer 44 again equal the torque signal provided by potentiometer 32. The process repeats itself at each instant when the torque signal exceeds the modified rotation signal. It should be clear that the modified rotation signal is equal to the sum of all the incremental angles of rotation multiplied by instantaneous factors X and can be referred to for convenience as an integrated rotation signal. Mathematically the integrated rotation signal can be expressed as $\Sigma X \Delta R$ or $\int X dR$ where X is the instantaneous factor and $\Delta R$ is the incremental rotation of the fastener.

If the tightening region of the Torque-Rotation curve illustrated in FIG. 1, points A to B, is exactly linear, one-way amplifier 50 would provide an initial signal adjusting the gear ratio of variable ratio gear system 40 which would then multiply the rotation signal providing the integrated rotation signal. Because of the linearity of the curve, no further adjustment of the variable ratio gear system would be provided. When point B on the curve illustrated in FIG. 1 is reached, the rotation signal is increasing faster than the torque signal and the output from comparator 48 is a reverse polarity signal, for convenience the reverse polarity signal will be hereinafter considered negative, and this signal cannot be fed through one-way amplifier 50 because of its one-way gain characteristic. As will be fully explained hereafter, the negative signal is fed to a decision making circuit 52 which processes that signal to determine when the yield point of the fastener has been reached and to then develop a control signal which is fed to control valve 20 to shut off the wrench. As is most usual, however, the Torque-Rotation curve is not exactly linear in the tightening region and, accordingly, one-way amplifier 50 is continuously adjusting the setting of variable ratio gear box 40 until the maximum slope of the curve is experienced, point M on the curve. When point M is experienced, the integrated rotation signal begins increasing faster than the torque signal and the signal from comparator 48 begins to reverse polarity, again for convenience also hereinafter considered negative, and has a relatively small value until point B is reached when it increases significantly. The negative signal is fed to decision-making circuit 52 to be processed and determine when the yield point of the fastener has been reached and to then develop a control signal which is fed to control valve 20 to shut off the wrench. Thus, the negative signals are decision-making signals.

The above explanation of the invention is graphically illustrated in FIG. 3 of the drawing which is a plot of the signal from potentiometer 32 which is representative of the torque being applied to the fastener versus the signal from potentiometer 44 which is representative of the integrated rotation signal. The torque signal is plotted on the vertical axis of the curve and the integrated rotation signal is plotted on the horizontal axis. Neither potentiometer provides an output until the snug torque is applied to the fastener, that is until point A on the curve illustrated in FIG. 1 is reached. Beyond point A and up to point B or M on the Torque-Rotation curve, depending on the exact characteristic of the tightening region, for each incremental increase in torque, $\Delta T$ there is an increase in rotation, $\Delta R$, which most probably does not numerically equal the increase in torque. Projecting the incremental increase in torque, $\Delta T$ from FIG. 1 to FIG. 3 it can be seen that in accordance with this invention each incremental increase in torque results in an equal incremental increase in the integrated rotation signal, $X \Delta R$. Because the integrated rotation signal is maintained equal to the torque signal the curve illustrated in FIG. 3 is a straight line forming an angle of 45° with the axes until the appropriate point B or M on the curve illustrated in FIG. 1 is reached. Beyond the appropriate point, the curve starts to flatten indicating that the output of comparator 48 is negative.

Still referring to FIGS. 1 and 3, it can be seen that for any increment of rotation, the rotation signal is multiplied by a factor X and it will now be explained that factor X is representative of the instantaneous slope of the Torque-Rotation curve of FIG. 1. Since the torque signal in the tightening region is equal to the integrated rotation signal, the following equation can be written:

$$T - \Sigma X \Delta R = 0$$

Thus, before the negative signal is provided by comparator 48, that is before points B or M are reached, the above equation means that for each increment of rotation the following equation can be written:

$$X \Delta R = T$$
and
$$X = \Delta T / \Delta R$$

Of course, $\Delta T / \Delta R$ is the slope of the Torque-Rotation curve. One other point to note is that if the slope of the Torque-Rotation curve varies, the factor X, which cannot be decreased, eventually represents the maximum slope of the curve.

Figure 7:
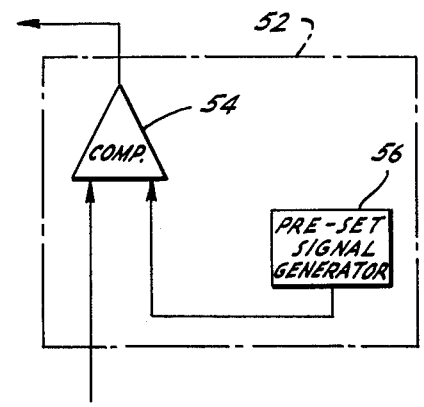
FIG. 7-9 each illustrate a different circuit for processing signals developed by various embodiments of apparatus in accordance with the invention to determine when a yield point has been reached.
Figure 8:
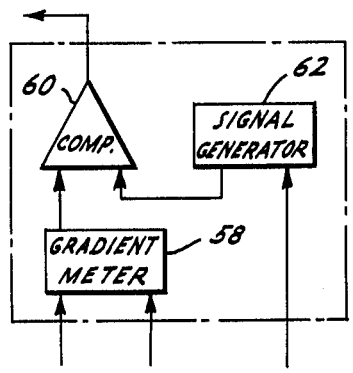
Figure 9:
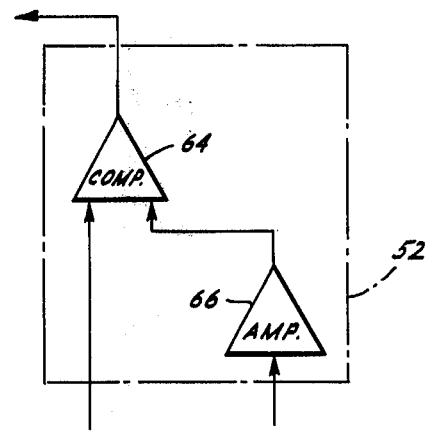

Completing the description of the FIG. 4 embodiment of the invention, reference is made to FIGS. 7–9 wherein different decision-making circuits 52 usable therewith are illustrated. In FIG. 7, a first embodiment of decision-making circuit 52 is illustrated and includes a comparator 54 to which the negative or decision-making signal from comparator 48 is fed. Also fed to comparator 54 from a signal generator 56 is a predetermined negative signal indicative of the expected signal from comparator 48 at the yield point. When the decision-making signal from comparator 48 is substantially equal to or more negative than the predetermined signal from signal generator 56 the control signal is developed and fed to control valve 20 closing the control valve and shutting off the wrench. It should be noted that comparator 54 and signal generator 56 are conventional apparatus and need not be explained further.

The decision-making circuit described with respect to FIG. 7 of the drawing, is particularly usable in those instances where the specifications of the joint being tightened are known and where average values representative of the yield point can be predetermined and set into signal generator 56. With the circuit disclosed in FIG. 7 a reasonable degree of accuracy can be obtained. However, in those instances where the specifications of the joint are not known beforehand or where a higher degree of accuracy is desired, the decision-making circuit can be of the type illustrated in FIGS. 8 and 9 of the drawing.

In FIG. 8 a second embodiment of decision-making circuit 52 is illustrated and includes a gradient meter 58 which receives the negative decision-making signal from comparator 48 and integrated rotation signals from potentiometer 42. Gradient meter 58 may be in the form of a shift register and a subtraction circuit each of which receives a decision-making signal as an input and which are connected in series. The shift register can be clocked by the integrated rotation signal which would be fed to the shift register through an analogue to digital convertor and the output of the shift register is also fed to the subtraction circuit which of course, subtracts its input signals and provides an output signal representative of the rate of change of the decision-making signal with respect to the integrated rotation signal. The output signal from gradient meter 58 is fed to a comparator 60 which receives another negative input signal from a signal generator 62 which has been determined to be representative of the expected rate of change of the decision-making signal with respect to the integrated rotation signal at the yield point. As will be made clear hereinafter, it has been determined that when the rate of change of the decision-making signal with respect to the integrated rotation signal has a predetermined relationship with the maximum slope of the Torque-Rotation curves the yield point has been reached and this relationship is set into signal generator 62 which as will be made clear is in the nature of a calculator. When comparator 60 determines that its input signals are substantially equal or that the signal from gradient meter 58 is more negative than the signal from signal generator 62, it provides a control signal to control valve 20 closing the control valve and shutting off the wrench.

The relationship set into signal generator 62 can be understood from the following explanation. The decision-making signal from comparator 48 can be expressed as follows:

$$D = X_m (R - R_m) - (T - T_m)$$

In the above equation D represents the decision-making signal, $X_m$ represents the factor at the point $M$ or the maximum slope of the Torque-Rotation curve; R represents the instantaneous rotation; $R_m$ represents the rotation at point M; T represents the instantaneous torque; and, $T_m$ represents the torque at point M. Continuing the explanation and using the same symbols explained above, the output of gradient meter 58 can be expressed as follows:

$$\Delta D / \Delta R$$

and by substituting for $\Delta D$ from above, this equation can be rewritten as follows:

$$;190$$

From the explanation provided in the co-pending application, Ser. No. 507,417 filed Sept. 19, 1974 for Apparatus for and Method of Determining Rotational or Linear Stiffness by John T. Boys, it is known that at the yield point $\Delta T/\Delta R$ has a value of from 0.25 to about 0.75 and most commonly about 0.50 of the maximum slope of the Torque-Rotation curve. By utilizing this fact, it can be seen that the yield point can be defined by rewriting the last equation as follows:

$$, X_m - 0.50 \, X_m$$

or $$X_m (1 - 0.50)$$

or $$0.50 \, X_m$$

Thus, it can be seen that when the signal representative of the rate of change of the decision-making signal with respect to the integrated rotation signal is equal to about 0.50 $X_m$ or, if desired, is within a range of about 0.25 $X_m$ to about 0.75 $X_m$ , the yield point has been reached. Accordingly, signal generator 62 receives signal from one-way amplifier 50 which is representative of the maximum slope of the Torque-Rotation curve, $X_m$ , and includes a calculator circuit for performing the calculation in accordance with the desired predetermined relationship, as explained, and provides an output signal in accordance therewith which is fed to comparator 60 for comparison with the signal from gradient meter 58 as also explained.

The decision-making circuit 52 illustrated in FIG. 9 of the drawing includes a comparator 64 which receives the negative decision-making signal from comparator 48 and which also receives a negative signal from an amplifier 66. The negative signal from amplifier 66 is proportional to the torque being applied to the fastener or, preferably, to the rotation of the fastener and, accordingly, receives an input signal from either potentiometer 32 or 44. In accordance with this embodiment of decision-making circuit 52, the control signal closing control valve 20 and shutting off the wrench is developed when the decision-making signal has a predetermined relationship with either the torque or integrated rotation signals. Thus, amplifier 66 conditions its input signal in accordance with the predetermined relationship and provides a negative output signal which is compared with the decision-making signal. It has been determined that amplifier 66 should provide an output signal of approximately −0.002 to −0.020 of the torque or the integrated rotation signal. When comparator 64 determines that the decision-making signal is more negative than the signal from amplifier 66, it develops a control signal which is fed to control valve 20 closing the valve and shutting off the wrench.

Referring next to FIG. 5 of the drawing, another embodiment of the invention is disclosed and is generally similar to that illustrated in FIG. 4. Accordingly, similar reference numerals are utilized for like parts. In this embodiment, gears 26, 28, 34 and 38 have been eliminated as well as variable ratio gear box 40 and potentiometers 32 and 44. The torque signal is generated by a torque cell 74 mounted between output shaft 16 and rigid frame 76, a frame somewhat similar to frame 22 in the FIG. 4 embodiment. Torque cell 74 is a generally conventional device including a flexible annular member on which strain gauges 78 are attached and which may be connected in a Wheatstone Bridge (not illustrated) to generate signals representative of the torque applied to the fastener by measuring the reaction torque on the wrench. For producing the signal representative of angular rotation, a suitable encoder 80 is carried on an inward extension of drive shaft 16 and rotates therewith. A proximity probe 82 is mounted through the housing of motor 14 and senses passage of the teeth formed on encoder 80 and develops signals representative of predetermined increments of angular rotation of the fastener. The incremental signals are fed through a multiplier 84 whose setting is controlled by the output of one-way amplifier 50. The multiplied signals are added in a suitable adding device 86 to provide an integrated angular rotation signal similar to that developed by potentiometer 44 in the FIG. 4 embodiment. The signals from torque cell 74 and adding device 86 are fed through comparator 64 and are processed as in the embodiment disclosed in FIG. 4. When the decision-making signal is developed it is fed to decision-making circuits 52 of FIGS. 7–9 and are processed to develop the control signal and shut off wrench 12.

Referring now to FIG. 6, another embodiment of a tightening system in accordance with this invention is illustrated and is also generally similar to that illustrated in FIG. 4. Accordingly, like reference numerals are used for similar parts which will not be described in detail. As seen in FIG. 6, potentiometers 32 and 44 and comparator 48 have been eliminated and replaced by a single potentiometer 88. Shaft 30 drives the inner core of potentiometer 88 and shaft 42 drives the outer portion or slider assembly of the potentiometer. Rotation of the inner core of potentiometer 88 is a signal representative of the torque being applied to the fastener and rotation of the outer portion is a signal representative of the rotation of the fastener or the integral of the rotation multiplied by the ratio of gear box 40 depending on whether the setting of the gear box has been set by one-way amplifier 50. Electrical signals developed by potentiometer 88 are thus equivalent to signals from comparator 48 in the FIG. 4 embodiment. That is, if the signals are equal the inner core and outer portion of potentiometer rotate in unison at a null point and provide no output. When one of the signals is increasing faster than the other, the signal from potentiometer 88 is fed either through one-way amplifier 50 or decision-making circuit 52 which can be in accordance with FIG. 7 of the drawing.

While in the foregoing there have been disclosed several preferred embodiments of a tightening system in accordance with this invention, various changes and modifications should be obvious to one skilled in the art and are within the intended scope of the invention as recited in the claims.

We claim:
1. A tightening system for tightening an assembly including a fastener member until a yield point is detected, said system comprising:
   first means for developing a first signal representative of a first tightening characteristic of the assembly and second means for developing a second signal representative of a second tightening characteristic of the assembly;
   third means responsive to said first and second signals for determining when said first signal is greater than said second signal and for modifying said second signal by increasing increments of said second signal to correspond to said first signal, and for developing a decision-making signal when the rate of increase of said first signal decreases with respect to said modified second signal; and
   control means responsive to said decision-making signal for developing a control signal when the yield point of the assembly is reached.

2. A tightening system in accordance with Claim 1 wherein said first signal is representative of the torque applied to the fastener and wherein said second signal is representative of the rotation of the fastener.

3. A tightening system in accordance with Claim 2 wherein said third means includes comparator means and signal multiplier means operatively connected between said second means and said comparator means, said signal multiplier means being operative to multiply said increments of said rotation signal, the output from said signal multiplier means being said modified rotation signal, and said comparator means being operative to continuously compare said torque signal with said modified rotation signal to determine which of said signals is greater.

4. A tightening system in accordance with Claim 3 wherein said comparator means provides said decision-making signal if said modified rotation signal is greater than said torque signal and provides another signal if said torque signal is greater than said modified rotation signal.

5. A tightening system in accordance with Claim 4 wherein said another signal is fed to one-way amplifier means which controls said signal multiplier means.

6. A tightening system in accordance with Claim 2 wherein said third means modifies said rotation signal by multiplying increments of said rotation signal.

7. A tightening system in accordance with Claim 2 wherein said third means modifies said rotation signal by multiplying increments of said rotation signal by the slope of the torque-rotation curve which could be plotted for the assembly being tightened.

8. A tightening system in accordance with Claim 7 wherein said increments of said rotation signal are multiplied by the instantaneous slope of said torque-rotation curve and after said rate of increase of said torque signal decreases with respect to said modified rotation signal, said increments of said rotation signal, said increments of said rotation signal are multiplied by the maximum slope of said torque-rotation curve.

9. A tightening system in accordance with claim 2 wherein first said means includes a shaft driving a potentiometer and wherein said second means includes a shaft driving said potentiometer.

10. A tightening system in accordance with claim 2 wherein said first means includes a shaft driving a first potentiometer and wherein said second means includes a shaft driving a second potentiometer.

11. A tightening system in accordance with claim 2 wherein said first means includes a torque measuring cell and wherein said second means includes an incremental encoder.

12. A tightening system in accordance with claim 2 wherein said control means includes means for comparing said decision-making signal with a predetermined signal.

13. A tightening system in accordance with claim 2 wherein said control means includes means for determining the rate of change of said decision-making signal and means for comparing the rate of change of said decision-making signal with a signal representative of the slope of the Torque-Rotation curve and for determining when said rate of change of said decision-making signal is a predetermined fraction of said signal representative of the slope of the Torque-Rotation curve.

14. A tightening system in accordance with claim 13 wherein said predetermined fraction is within a range of about 0.25 to 0.75.

15. A tightening system in accordance with claim 14 wherein said predetermined fraction is about 0.50.

16. A tightening system in accordance with claim 1 wherein said control means includes a means for comparing said decision-making signal with one of said torque or modified rotation signals and for developing said control signal when said compared signals have a predetermined relationship.

17. A tightening system in accordance with claim 16 wherein said control signal is developed when said decision-making signal is about 0.002 to about 0.02 of said one of said signals.

18. A tightening system in accordance with claim 1 wherein said control signal is operative to stop the tightening of the fastener.

* * * * *